US005643389A

United States Patent [19]

Kalisiak et al.

[11] Patent Number: 5,643,389

[45] Date of Patent: Jul. 1, 1997

[54] STACKED PRESSURE SEAL METHOD

[75] Inventors: Michael S. Kalisiak, North Tonawanda; Eugene E. Mietlicki, Tonawanda, both of N.Y.

[73] Assignee: Moore Business Forms, Inc., Grand Island, N.Y.

[21] Appl. No.: 933,823

[22] Filed: Aug. 24, 1992

Related U.S. Application Data

[62] Division of Ser. No. 779,898, Oct. 21, 1991, Pat. No. 5,169,489.

[51] Int. Cl.[6] .......... B32B 31/00

[52] U.S. Cl. .......... 156/290; 156/292; 156/555; 271/185

[58] Field of Search .......... 156/290, 291, 156/292, 479, 548, 553, 555, 556; 100/93 RP, 153, 171; 493/206, 208; 271/185, 186, 225

[56] References Cited

U.S. PATENT DOCUMENTS

| | | | |
|---|---|---|---|
| 2,331,054 | 10/1943 | Shively | 156/209 |
| 3,741,085 | 6/1973 | Sutton | 493/29 |
| 3,749,631 | 7/1973 | Batchelder et al. | 156/350 |
| 4,033,807 | 7/1977 | Neill et al. | 156/384 |
| 4,285,607 | 8/1981 | Steinhilber | 400/625 |
| 4,343,129 | 8/1982 | Gunther, Jr. et al. | 53/209 X |
| 4,744,553 | 5/1988 | Hirose | 271/186 X |
| 4,826,475 | 5/1989 | Eweryd | 493/29 X |
| 4,884,097 | 11/1989 | Giannetti et al. | 271/186 X |
| 4,928,807 | 5/1990 | Auerbach | 271/185 X |
| 4,928,953 | 5/1990 | Heina et al. | 271/185 |
| 4,967,899 | 11/1990 | Newsome | 271/185 X |
| 5,104,116 | 4/1992 | Pohjola | 271/185 |

*Primary Examiner*—James Engel
*Attorney, Agent, or Firm*—Nixon & Vanderhye P.C.

[57] ABSTRACT

A system and method for pressure sealing business forms provide for maximum utilization of floor space and ease of control by an operator. First and second pressure sealing devices, each having upper and lower sets of rollers forming nips for sealing business forms only along strips of pressure sensitive adhesive, are mounted one above the other. A common drive is provided for the drive rollers of each set, for each sealing device. Tape conveyors assist in conveying the forms through the first sealer, around a horizontal axis large diameter drum, and from the large diameter drum through a second sealer, the forms moving in the opposite direction to the one they moved in through the first sealer when going through the second sealer. A rotator is provided between the drum and the second sealer for changing the orientation of the forms about 90°. The forms are fed to the first sealer by an infeed conveyor/deshingler, and are removed from the second sealer by an outfeed conveyor/stacker.

7 Claims, 3 Drawing Sheets

STACKED PRESSURE SEAL METHOD

This a division of application Ser. No. 07/779,898 filed Oct. 21, 1991, now U.S. Pat. No. 5,169,489.

BACKGROUND AND SUMMARY OF THE INVENTION

The Moore 4800 Speedisealer® pressure sealing system has become an accepted piece of equipment for handling a variety of business forms, particularly mailers, in a very efficient manner, without requiring the use of expensive and difficult to maintain (in an office environment) heat sealing equipment. The Moore system, such as shown in U.S. patent application Ser. No. 07/417,725 filed Oct. 6, 1989, the disclosure of which is hereby incorporated by reference herein, and which utilizes a document rotator, such as shown in U.S. application Ser. No. 07/697,994 filed May 10, 1991, typically either delivers the forms in an in-line configuration, the forms coming into the equipment at one end, and out at an opposite end along a straight line from the inlet, or delivers the forms in a position at a right angle from the inlet. The only significant drawback to such a system is the floor space requirements. In office environments where floor space is at a premium, and/or where it is desirable to be able to have one operator easily monitor both the infeed and outfeed operations, or simultaneously monitor several machines, the conventional equipment is less than desirable.

According to the present invention, two pressure sealing devices such as those in the conventional Moore 4800 Speedisealer® are mounted in a vertically stacked orientation so that they take up a minimum of floor space, and so that an operator standing at a single location can monitor both the infeed to and outfeed from the pressure sealer.

The pressure sealing system according to the invention uses basically the same types of sealing devices and rotator as in the conventional Moore 4800 system, and is described in the above-mentioned patent applications. However in order to accommodate vertical stacking of the sealing units a few basic changes are made.

One basic change of the system according to the invention compared to the conventional Moore equipment is to utilize a horizontal axis relatively large diameter drum, with conveyor tapes associated with the drum. The drum diameter is typically about the same as the vertical spacing between the nips of the rollers of the first and second sealers. The conveyor tapes deliver forms from the first sealer, around the outside circumference of the drum, and then toward the second sealer. Preferably the rotator is provided between the drum and the second sealer and the forms pass through the first sealer in landscape mode and through the second sealer in portrait mode. Proper delivery of the forms is simplified if they have these relative orientations.

Another significant departure from the invention compared to the conventional Moore system is the ability to drive the drive rollers for both sealers at the same time, with the same mechanism. The lower rollers of the topmost sealer can be connected by a common belt drive to the upper rollers of the lowermost sealers, and all such rollers can be driven by a common motor. This thus simplifies the equipment that is utilized and reduces the cost of the equipment. This arrangement also inherently facilitates utilizing common conveyor tapes for part of both the upper and lower sealers, common middle conveyor tapes being provided.

It is the primary object of the present invention to provide a compact pressure sealing system, and effective method of handling business forms to effect pressure sealing of strips of adhesive thereon. This and other objects of the invention will become clear from an inspection of the description of the invention and from the appended claims.

DETAILED DESCRIPTION OF THE DRAWINGS

Figure 1:
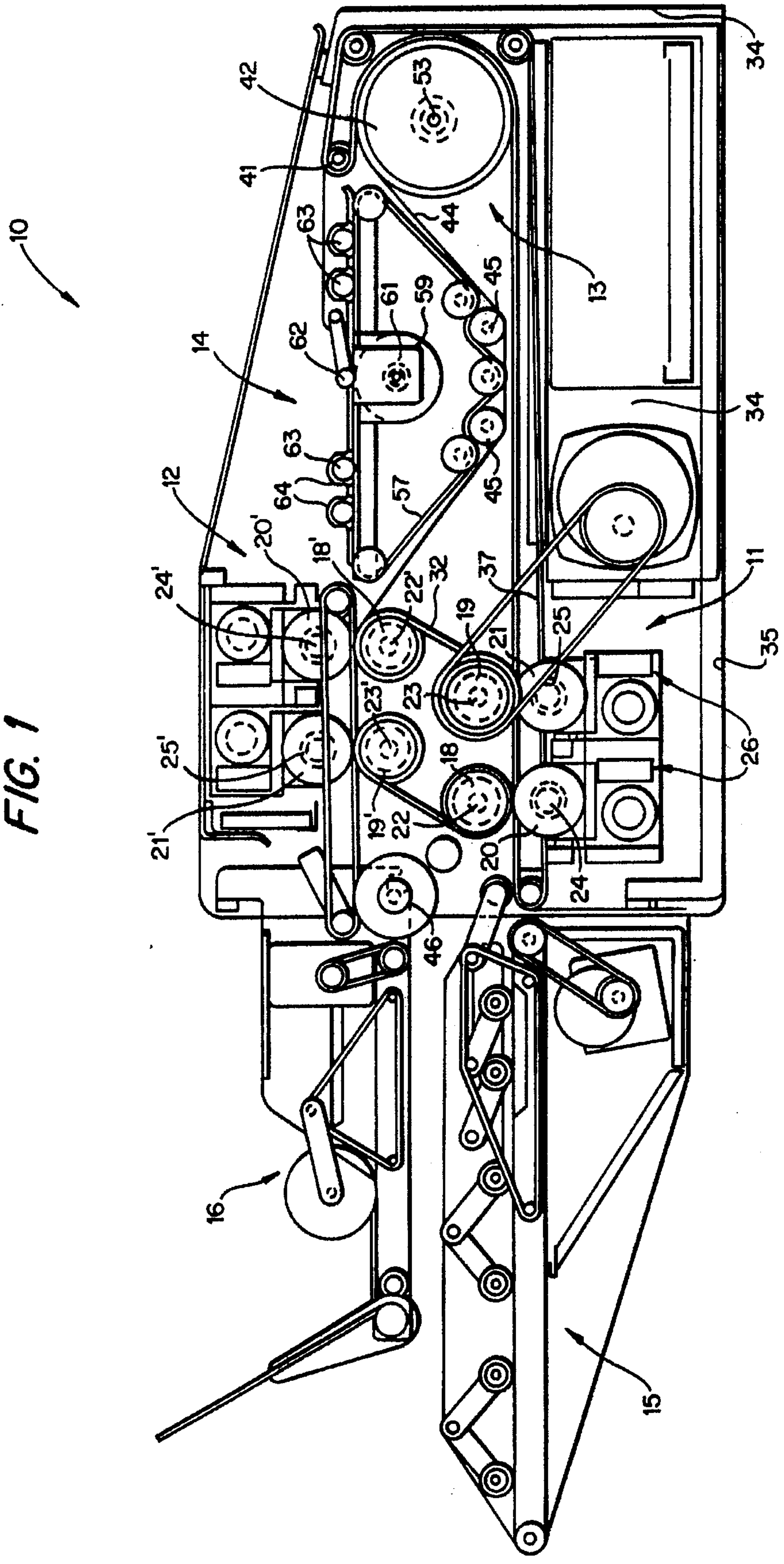
FIG. 1 is a side view, with the nearer side cover of the apparatus removed for clarity of illustration, of an exemplary pressure sealing system according to the invention.

The pressure sealing system according to the invention is shown generally by reference numeral 10 in FIG. 1. The main components of the system 10 comprise a first pressure sealing device 11, a second pressure sealing device 12, reorientation means 13, and business form rotating means 14. Also, preferably a known infeed conveyor/deshingler 15 is provided for feeding forms to the first pressure sealing device 11, and a known outfeed conveyor/stacker 16 is provided for removal and stacking of forms from the second sealing device 12.

Figure 6:
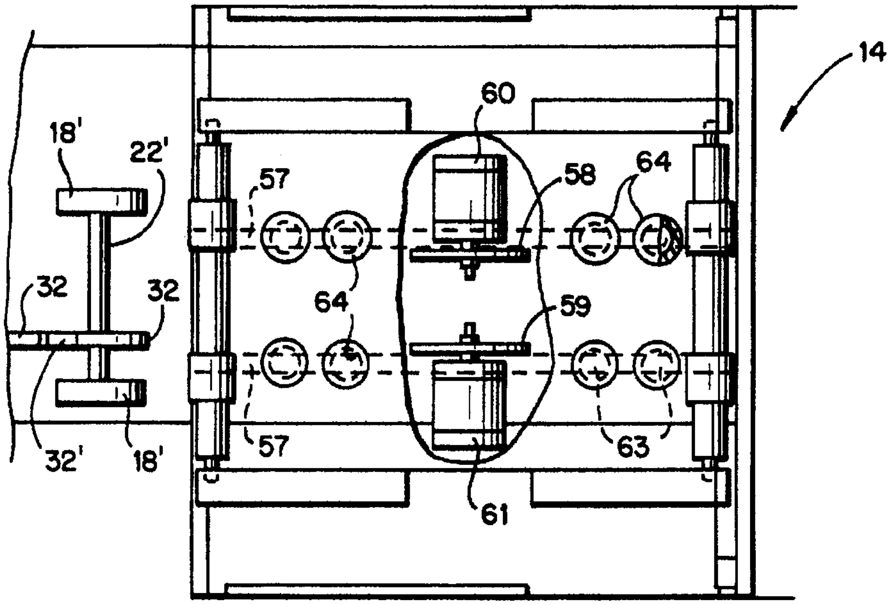
FIG. 6 is a top plan view, with portions cut away for clarity of illustration, of the rotator of FIGS. 1 and 2.

The first pressure sealing device 11 has basically the same construction as shown in U.S. application Ser. No. 07/417,725 filed Oct. 6, 1989, the disclosure of which is incorporated by reference herein, and as in commercially available Moore pressure sealing equipment. It comprises one or more upper rollers 18, 19 cooperating with one or more lower rollers 20, 21. A nip is formed between each of the rollers 18, 20 and 19, 21. The rollers 18, 20 and 19, 21, respectively, are on a common vertical centerline. The rollers are mounted for rotation by horizontally extending parallel shafts 22, 23, 24, 25, and —as shown in said co-pending application, and schematically in FIG. 6 for shaft 22'—preferably the shafts 22–25 have disposed thereon at a position spaced along the axis defined thereby another identical roller. The rollers 18 through 21 have a width which is approximately the same size as (typically only slightly larger, to about twice as large) as the width of a strip of pressure sensitive adhesive to be sealed thereby.

Spring biasing means, such as shown only schematically at 26, or the like may be provided for biasing the rollers toward each other so as to provide sufficient pressure to effect activation of the pressure sensitive adhesive without heat or any other facilitating condition. The nips between the rollers 18, 20 and 19, 21 are in line with each other in a generally horizontal plane, and typically a business form is supplied to the first sealing device 11 by the infeed conveyor/deshingler 15 in a landscape mode, with adhesive strips on the remote edges thereof which are simultaneously sealed by the rollers spaced along the shafts 22 through 25.

The second sealer 12 is substantially identical to the first sealer 11, forming a second nip between the rollers 18', 20', and 19', 21', respectively. The only two significant differences between the sealers 11, 12 are that the sealer 12 is an "upside down" version of the sealer 11, being disposed vertically spaced (above in the embodiment illustrated in FIG. 1) therefrom, and because the sealer 12 typically will receive a business form in the portrait mode, the rollers 18'–21' spaced along the shafts 22'–25' thereof are closer together than the corresponding rollers 18–21, sealing spaced strips of pressure sensitive adhesive along the side edges of the form delivered thereto in the portrait mode.

Because of the relative orientation of the sealing devices 11, 12, according to the invention it is possible to drive them simultaneously. That is the rollers 18, 18', 19, and 19' may comprise the drive rolls for the sealers 11, 12, and all may be driven simultaneously. The manner in which this is done is illustrated most clearly in FIGS. 1 and 3, utilizing a conventional drive motor 28. The shaft 23 has a pulley 29 thereon spaced from the rollers 19 along the length of the shaft 23, and that pulley 29 receives a belt 30 connected to a drive pulley 31 of the motor 28. A drive belt 32 then interconnects circumferential portions of the rollers 18, 18', 19, 19' (spaced from the nips thereof), or pulleys (e.g. 32' in FIG. 6) rotatable with the rollers 18, 18', 19, 19', so that when the pulley 29 is driven by the belt 30, all of the rollers 18, 18', 19, 19' are driven simultaneously in the directions indicated by the arrows in FIG. 3.

Figure 3:
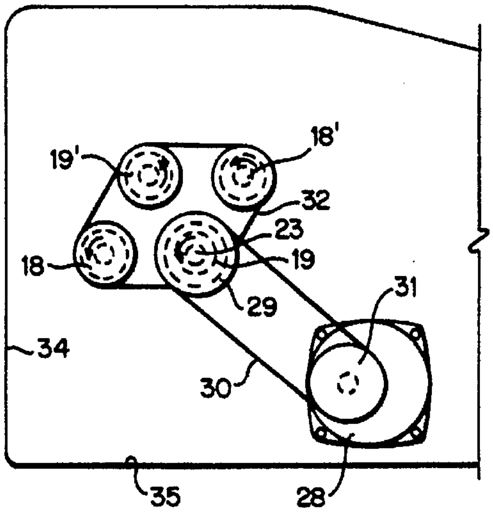
FIGS. 3 through 5 are detail side views of three different belt hook-ups for the system of FIGS. 1 and 2.

The system 10 also comprises a frame means, shown generally by the wall 34 and support structures 35 in FIGS. 1 and 3, for mounting the sealing devices 11, 12 so that they have the orientation illustrated in FIG. 1. Any suitable components may be provided associated with the frame means 34, 35, for effecting this mounting.

The system 10 also comprises conveying means for automatically and continuously conveying business forms between the first and second sealers 11, 12. The conveying means preferably take the form of three different sets of conveyor tapes, seen most clearly in FIGS. 1, 2, 4, and 5. All the conveyor tapes are shown in FIG. 1, the first and third sets are seen in FIG. 4, the first set in FIG. 2, and the second set in FIG. 5.

Figure 2:
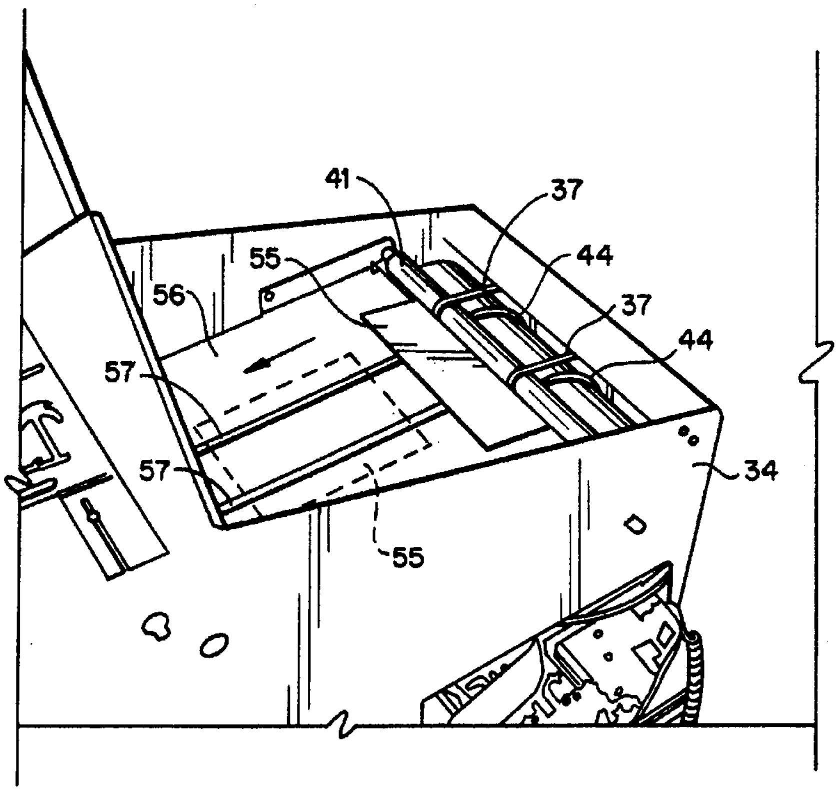
FIG. 2 is a top perspective view showing delivery of a form from a large diameter drum to the rotator.
Figure 4:
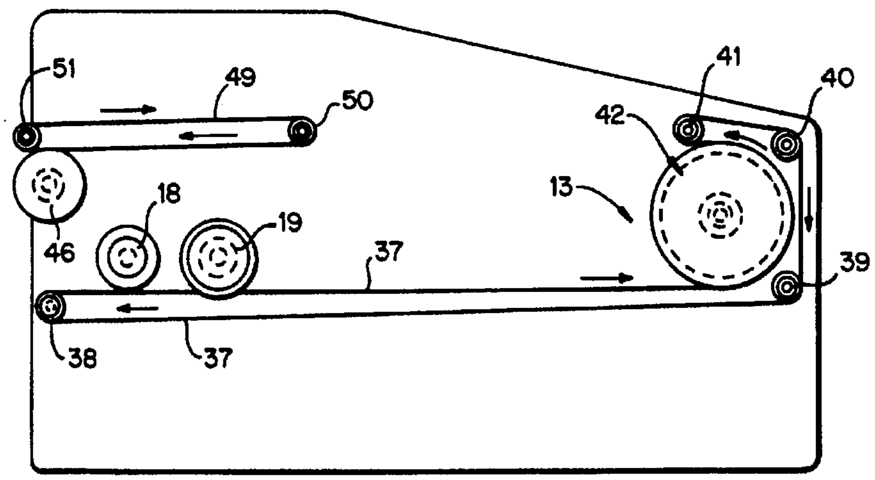

The first set of conveyor tapes of the conveying means is shown generally by reference numeral 37 in FIGS. 1, 2, and 4. The conveyor tapes are mounted at one position by the roller 38, and pass around the idlers 39, 40, and 41, cooperating with the large diameter drum 42 of the reorientation means 13, which will be described in detail later. The first conveyor tapes 37, which preferably comprise two spaced endless tapes, facilitate movement of the business forms in the landscape mode through the first sealer 11, to the reorientation means 13, around the drum 42 to the higher level of the second sealer 12, and deliver the forms in the landscape mode to the rotator 14. The first tapes 37 have portions thereof that engage roughly about 180° of the circumference of the drum 42. The tapes 37 also engage the business forms as they are being fed by the feeding means 15, for delivery to the first nip between the rolls 18, 20.

Figure 5:
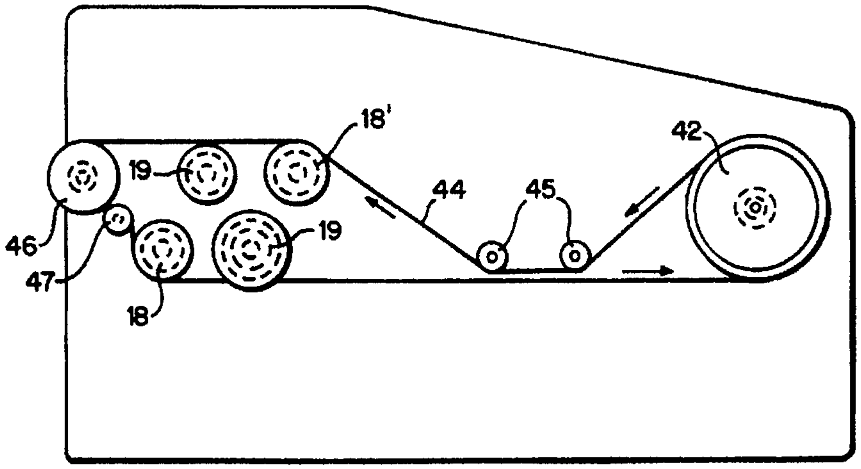

The second, middle, set of conveyor tapes, shown in FIGS. 1 and 5 by the reference numeral 44, preferably comprise two tapes which cooperate with both the first and second sealers 11, 12. The second conveyor tapes 44 go around roller 18, engaging the circumferential periphery of the roller 19, around the drum 42, and around various other reorienting rollers 45, 46, and 47, the tension being adjusted by the position of the roller 47. The rollers 45 provide diversion of the tapes 44 underneath the rotator 14. In some circumstances the tapes 44 may actually form a part of the rotator 14, but in the preferred embodiment illustrated in the drawings the rotator 14 is an integral unit distinct from the rest of the equipment, and hence the rollers 45 are provided. The tapes 44 also engage the circumferential peripheries of the rollers 18', 19' of the second sealer 12. The second set of conveyor tapes 44 thus engage the tops of the forms to facilitate delivery through the first sealer 11, then engage what becomes the bottoms of the forms as they go around the drum 42, and then ultimately engage the bottom of the forms again as they pass through the sealer 12. Note that a portion of the tapes 44 extend around the circumference of the drum 42 roughly 180° (slightly more).

The third set of conveyor tapes of the conveying means are shown in FIGS. 1 and 4, and comprise the conveyor tapes 49, preferably two spaced conveyor tapes, which simply move about the stationary axis roller 50, and the movable axis roller 51. The third set of tapes 49 facilitate the delivery of the forms in the portrait mode through the second sealer 12, engaging the tops of the forms in cooperation with the tapes 44 engaging the bottoms of the forms. The tapes 49 deliver the forms to the discharge means 16.

The reorientation means 13 moves the forms from the level of the first sealer 11 to the level of the second sealer 12. In the preferred embodiment, the reorientation means 13 comprises the large diameter drum 42 rotatable about a horizontal axis 53 which is parallel to the axes of the shaft 22, 23, 22', 23' Also the diameter of the drum 42 is greater than the vertical spacing between the shafts 23, 23', 22, 22' Preferably the diameter of the drum 42 is approximately the same as the vertical spacing between the first nip formed by the rollers 18, 20 and the second nip formed by the rollers 18', 20'.

The rotator 14 preferably is disposed on the second level, that is the level of the second sealer 12. The rotating means 14 is seen most clearly in FIGS. 1, 2, and 6. Its operation is as described in co-pending application Ser. No. 07/697,994 filed May 10, 1991, and co-pending application Ser. No. 07/763,267 filed Sept. 20, 1991, the disclosures of which are hereby incorporated by reference herein. The hold down components for the forms have been removed in FIG. 2 for clarity of illustration.

The rotator 14 receives a business form 55 (see FIG. 2) in the landscape mode from the drum 42 and roller 41. The business form 55 goes onto the flat, generally horizontal, surface 56 of the rotator 14, and while in engagement therewith preferably is driven toward the second sealer 12 by the conveyor tapes 57. The rotating rollers 58, 59, driven by the separately operable motors 60, 61 (see FIG. 6 in particular), effect rotation of the business form 55 to the dotted line position illustrated in FIG. 2, namely the portrait mode, in which mode it is delivered to the second sealer 12. In order to accommodate slight skewing of the business form 55, the rotating components as illustrated in said application Ser. No. 07/763,267, filed Sept. 20, 1991, may be utilized.

It is desirable to provide a variety of hold down mechanisms for holding the business forms in operative association with the plate 56, tapes 57, and roller peripheries 58, 59, while still allowing rotation thereof. For this purpose the lever mounted rollers 62 (one associated with each of the rollers 58, 59) may be provided, and additionally the balls 63 in sockets 64 arrangement may be provided. From the rotator 14, the forms 55 in the portrait mode are delivered to the second nip, between rollers 18', 20', in an automatic and continuous manner.

Utilizing the system 10 a method of handling business forms, each having at least first and second perpendicular strips of pressure sensitive adhesive of a predetermined width for affixing one part of the business form to another part (preferably each having first and third spaced, parallel strips and second and fourth spaced, parallel strips), is practiced by the following steps:

(a) At the first vertical level (at the level of sealer 11) automatically and continuously applying a compressive force substantially only at approximately the predetermined width of the first strip of adhesive to activate the adhesive to hold the parts of the business form together at the first strip. (b) Automatically and continuously conveying the business forms (55) from the first level to a second level (that of the sealer 12) vertically spaced from the first level (see FIG. 2). (c) After step (a) (and preferably after step (b) too), automatically and continuously rotating each business form (55) approximately 90° about a vertical axis (see the solid line and dotted line positions in FIG. 2). Preferably this step is practiced to rotate the forms from a landscape to a portrait mode. And, (d) automatically and continuously applying a compressive force substantially only at approximately the predetermined width of the second strip to activate the adhesive of the second strip of the form to hold the parts of the form together at that second strip.

The method also preferably comprises the steps of automatically and continuously feeding and deshingling business forms, with a feeding means/deshingler (15), prior to the practice of step (a), and automatically and continuously stacking the business forms (with the outfeed conveyor, stacker, 16) after step (d).

Utilizing the system as illustrated in FIG. 10 it will be readily apparent that an operator may easily monitor both the infeed conveyor/deshingler 15, and the outfeed conveyor/stacker 16 at the same time. As a matter of fact if a number of systems are mounted with their infeed conveyors 15 adjacent each other, a single operator may monitor a number of pieces of equipment. Also, the system 10 takes up a minimum of floor space, and provides the simplified driving of the rollers for the sealers, and the conveyor tape for conveying the forms to and between the sealers 11, 12.

While the invention has been herein shown and described in what is presently conceived to be the most practical and preferred embodiment thereof it will be apparent to those of ordinary skill in the art that many modifications may be made thereof within the scope of the invention, which scope is to be accorded the broadest interpretation of the appended claims so as to encompass all equivalent structures and procedures.

What is claimed is:

1. A method of handling business forms, each having at least first and second perpendicular strips of pressure seal adhesive of a predetermined width for fixing one part of the business form to another part, comprising the steps of:

(a) at a first vertical level and a first position automatically and continuously applying an adhesive activating compressive force substantially only at approximately the predetermined width of the first strip to activate the adhesive of the first strip to hold the parts of the business form together at that strip;

(b) automatically and continuously conveying the business forms from the first level to a second level, vertically spaced from the first level;

(c) after step (a), automatically and continuously rotating each business form approximately ninety degrees about a vertical axis;

(d) conveying the business form to a second position in substantial vertical alignment with said first position, and (e) automatically and continuously applying an adhesive activating compressive force substantially only at approximately the predetermined width of the second strip to activate the adhesive of the second strip to hold the parts of the business form together at that strip.

2. A method of handling business forms as recited in claim 1 wherein each form has first and third spaced, parallel strips of pressure seal adhesive, and second and fourth spaced, parallel strips of pressure seal adhesive; and wherein step (a) is practiced to simultaneously supply pressure only at the approximate widths of the first and third strips to activate the adhesive thereof, and wherein step (d) is practiced to simultaneously supply pressure only at the approximate widths of the second and fourth strips to activate the adhesive thereof.

3. A method of handling business forms as recited in claim 2 wherein step (c) is practiced between steps (b) and (d).

4. A method as recited in claim 3 wherein the first level is vertically above the second level.

5. A method as recited in claim 1 comprising the further step of automatically and continuously stacking the business forms after step (d).

6. A method as recited in claim 1 comprising the further step of automatically and continuously deshingling business forms just prior to the practice of step (a).

7. A method as recited in claim 1 wherein step (a) is practiced with the business forms in landscape mode, and step (d) with the forms in portrait mode, and wherein step (c) practiced to effect rotation of the forms from the landscape mode to the portrait mode.

* * * * *